Nov. 29, 1966     H. O. SELTSAM     3,287,796
METHOD OF MAKING A JOINT
Filed March 26, 1965
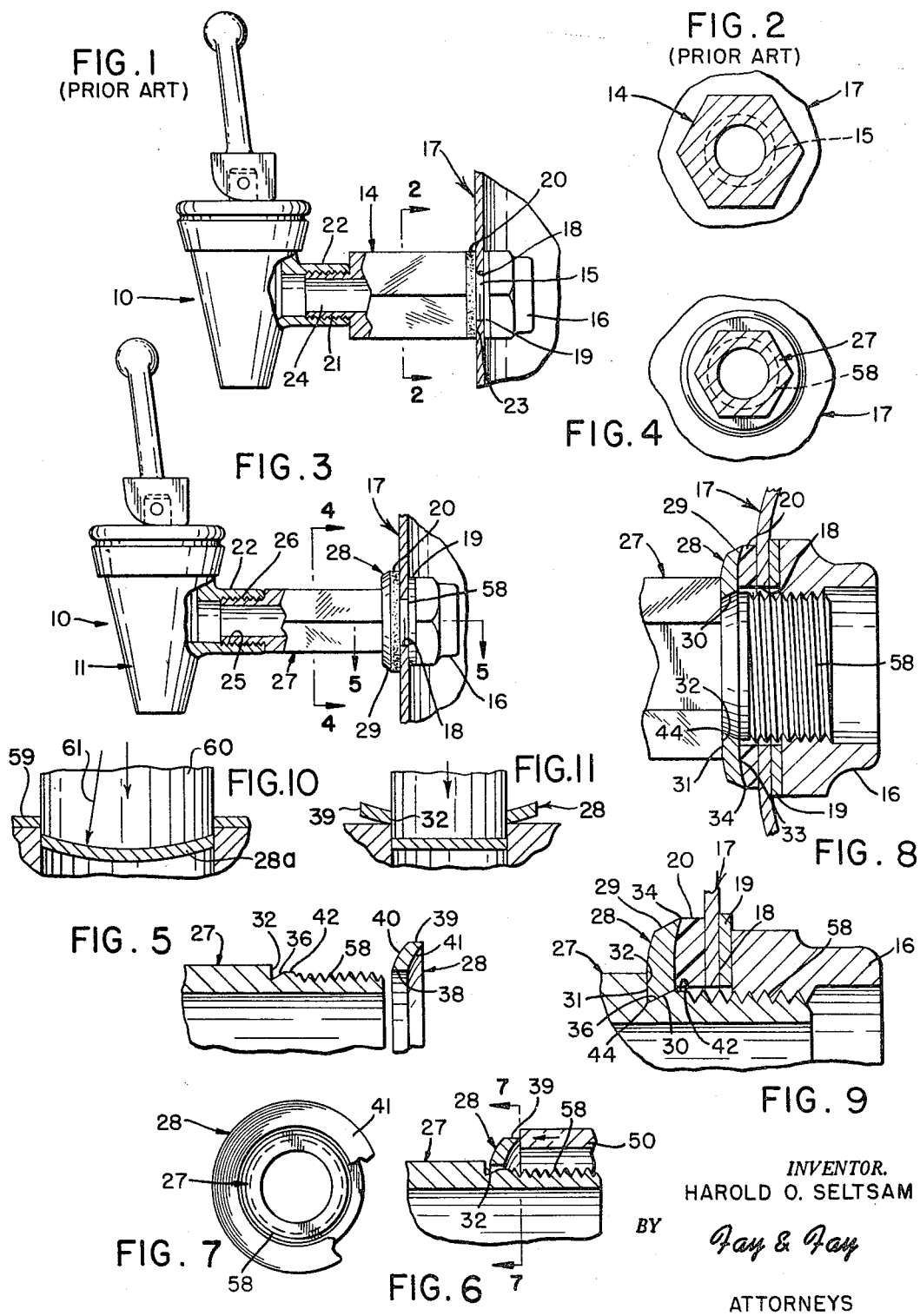
INVENTOR.
HAROLD O. SELTSAM
BY
*Fay & Fay*
ATTORNEYS

United States Patent Office 3,287,796
Patented Nov. 29, 1966

3,287,796
METHOD OF MAKING A JOINT
Harold O. Seltsam, Lakewood, Ohio, assignor to Tomlinson Industries, Inc., Cleveland, Ohio, a corporation of Ohio
Filed Mar. 26, 1965, Ser. No. 442,969
3 Claims. (Cl. 29—157)

This application is a continuation in part of the U.S. patent application of Harold O. Seltsam which was filed in the Patent Office on May 31, 1962, and assigned Serial No. 198,980, now abandoned.

The invention relates to a novel solution of the problem of joining a shank and/or valve to a thin-wall pipe or container, and more specifically deals with a novel means and method of making an economical, rigid, fluid-tight connection.

Prior art developments have provided several methods of fastening a shank or pipe to the side of a pipe or container. More acceptable among these are the conventional tapered pipe fitting, welding, or brazing, a bolted flange connection, or a threaded shank with a flange nut on opposite sides of the wall. A more recent solution entails the use of a shank with an integral flange and reduced threaded portion. Such methods, however, have not presented a satisfactory solution to the problem of joining a shank or pipe fluid-tight to a thin walled container, or, alternatively, are disadvantageous for one or more reasons. This is better understood when each of the above enumerated methods is considered specifically in the light of the objectives to be attained by the invention embodied herein.

The conventional tapered thread joint is unsatisfactory for use in joining a shank to a thin walled container. This is understood best when one considers that the wall thickness is of such a magnitude that the required number of female threads to establish a rigid, fluid-tight joint cannot be cut in the aperture.

Welded or brazed joints are oftentimes impossible to make on thin walled containers. If the structure of the wall is such that a welded or brazed joint is possible, it generally is disadvantageous from the cost standpoint in that it requires a semi-skilled workman and expensive equipment to effect the same. Moreover, the heat of the welding or brazing operation tends to discolor the decoratively polished parts, as well as presenting an unfinished appearance when the welding operation is complete.

Bolted flange joints are not always possible to make when joining a shank and a thin walled container. The bolted flange joint, because of its bulky size, is costly to manufacture as well as expensive to assemble because of the multiple parts and apertures required. Moreover, the bulky appearance of the finished assembly does not lend beauty to the finished product and is not, therefore, suitable from the marketing standpoint.

A further attempt to solve the problem of joining a shank to a thin walled part resulted in the development of a threaded shank extending through the thin wall with a flange nut on opposite sides thereof. Suitable gasket material was interposed between the nuts and the wall. Several disadvantages present themselves with such an arrangement. Firstly, the number of parts required to complete the joint is objectionable, both from the cost of manufacture and the additional time required to assemble the unit. More importantly, an adequate fluid-tight seal along the threaded portion was almost impossible to achieve. Lastly, the overall appearance of the assembled joint was unsatisfactory from the marketing standpoint because the external nut and seal assembly did not present a truly finished appearance.

A more refined solution of the problem is found in the embodiment shown in FIGS. 1 and 2. The shank shown requires the use of oversized stock, with subsequent machining to produce a substantial shoulder on one end thereof while reducing the end for threading. A sealing washer is placed in engagement with the shoulder and the threaded portion inserted through a suitable aperture in the thin wall. A coupling nut holds the shank fluid-tightly to the wall. The primary objection to this construction is the increased cost thereof. This is best appreciated when one considers that a substantial shoulder must be presented to the wall in order to obtain a rigid, fluid-tight connection. Such practice dictates that the minimum diameter of the stock must be at least equal to the designed diameter of the shoulder, which has to be somewhat greater than the aperture. An additional cost factor resides in the extensive machining required to produce the shoulder and the amount of scrap resulting therefrom. When due consideration is given to the thousands of such units that are produced yearly, the overall increased costs of such construction are of a great magnitude when compared with the present invention.

Considerable time, effort, and capital were devoted to seeking a more suitable and economical solution to these perplexing problems. Extensive experimentation resulted in the development of the novel method and means of joining pipes, couplings, valves, and the like, to thin-walled containers through use of the novel washer and method herein disclosed, thereby obviating the objections and disadvantages of the prior art solutions pointed out above.

The instant invention contemplates the use of a novel circular coupling flange which forms a mating surface for abutment with the container wall, thereby resulting in an extensive concentrically disposed area of contact therewith. The novel washer permits the coupling extension or shank to be of a drastically reduced diameter, when contrasted with that of the prior art, which results in considerable savings without impairment of the overall quality of the product.

The novel washer of the instant invention obviates the difficulties and avoids the disadvantages of the prior art since it is rigidly assembled to the shank so as to be integral therewith prior to joining to the container wall. A dished or concave surface is presented to the wall for even distribution of the load. The beveled outer edge of the finished washer assembly presents a streamlined appearance and enhances the overall beauty of the device. The inner edge of the washer establishes a fluid-tight connection with the shank without the use of additional sealing means.

In the light of the foregoing discussion and manifestation of the problems presented, it is an object of this invention to provide a new and improved joint between an arcuate container wall and a shank.

It is a further object of this invention to disclose a novel method and means for fluid-tightly joining a shank to a thin-walled container.

It is a further object of this invention to disclose a novel method for fluid-tightly assembling a sealing flange washer on a coupling shank so as to make the washer an integral unitary part thereof.

It is a further object of this invention to disclose a novel method for inexpensively making a fluid-tight joint with a thin walled container.

It is still a further object of this invention to disclose a novel modified shank and co-operating washer which may be assembled to become an integral unit without the use of adhesives, welding, brazing or the like.

It is a still further object of this invention to provide a shank and dished-out washer assembly which may be readily assembled to a thin walled container, with the former presenting a dished-out surface at the juncture thereof.

It is a still further object of this invention to disclose a novel method for assembling a coulping washer to a shank.

It is a further object of this invention to provide a novel method of manufacturing a concave washer for co-operation with a modified shank.

It is a further object of this invention to provide a novel method for assembling a washer to a grooved shank so as to provide a fluid-tight connection therebetween.

Further and fuller objects will become apparent when reference is made to the accompanying drawings wherein like parts bear like reference characters.

In the drawing:

FIG. 1 is an elevational view of a prior art solution illustrating a valve, shank, container and joint therebetween, with parts of the joint in section;

FIG. 2 is a cross-sectional view taken on the line 2—2 of FIG. 1;

FIG. 3 is a view similar to FIG. 1 showing the novel method of the present invention for securing a valve to a thin walled container;

FIG. 4 is a cross-sectional view taken on the line 4—4 of FIG. 3;

FIG. 5 is an enlarged fragmentary longitudinal cross-sectional view of the end of the shank and the spherical washer in position to be assembled;

FIG. 6 is a view similar to FIG. 5, illustrating the washer and shank assembled with a fragment of a tool in position to toggle the washer in place;

FIG. 7 is a view taken along the line 7—7 of FIG. 6;

FIG. 8 is an enlarged longitudinal cross-sectional view of the shank assembled to the wall, utilizing the novel washer of the instant invention;

FIG. 9 is a still further enlarged fragmentary longitudinal cross section of the juncture of the shank and wall more clearly illustrating the dished configuration of the washer;

FIG. 10 is a schematic showing of the blanking and forming operation; and

FIG. 11 is a schematic showing of the punching operation to form the central opening in the washer.

Referring to FIGS. 1 and 2, therein is shown a prior art device comprising a valve 10, shank 14, and thin walled container 17, with one end 15 of the shank 14 extending through a suitable opening 18 therein. The end 15 threadably receives a coupling nut 16. The opposite end 21 of the shank is externally threaded, concentric with the bore 24, for connection to the internally threaded valve extension 22. In practice, the coupling 14 is manufactured from extruded polygonal stock by cutting to length, turning and threading the ends. Upon inspection of FIG. 1, one can appreciate that a substantial shoulder 23 must be presented at the juncture of the shank and wall in order for proper distribution of forces at the wall, as well as suitable compression on the sealing washer 20. This requirement, as pointed out above, dictated the absolute minimum size of the polygonal stock that could be used prior to the novel invention herein disclosed. It can be further appreciated that considerable turning was required to produce an extensive radially extending shoulder and prepare the ends 15 and 21 for threading. This resulted in objectionable scrap, and required considerable machining time, both of which added to the cost of the finished product.

Referring to FIGS. 3–9, therein is disclosed the instant invention which has obviated the aforementioned objections. A valve 10 has a body portion 11 with a radial extension 22 which is internally threaded at 25 to receive an externally threaded end 26 to the shank 27. The opposite end of the shank 27 is similarly threaded 58 to receive a locking nut 16 after insertion through the aperture or opening 18 in the container wall 17. Interposed between the shank and the outer periphery of the wall 17 is the novel flange washer 28 and suitable packing 20.

As is best seen in FIGS. 8 and 9, the washer 28, in the assembled position, has a beveled external periphery 29, and internal periphery 30. The lateral surface 31 which abuts the abbreviated shoulder 32 generally lies in a plane which is at a right angle to the axis of the shank. The opposite lateral surface is very slightly dished 33 with the outer peripheral edge 34 in fluid-tight engagement with the packing 20 and wall 17. It is to be appreciated that loading on the shank will be first felt at the edge 34, which is a considerable distance from the opening 18, thereby distributing the points of force uniformly around the opening at a substantial distance therefrom.

The use of the washer 28 permits the use of polygonal stock of a drastically reduced size when compared to the prior art. The reduction can be best appreciated by a comparison of FIGS. 2 and 4, wherein the phantom lines indicate the equal major diameter of the threads. The utilization of the novel flange washer of the instant invention in one concrete embodiment permits use of polygonal stock which is 25 percent less in dimension across the flats when compared to the requirement of the prior art. When due consideration is given to the thousands of such units that are manufactured daily, the saving in material costs alone are evident. An additional advantage is the reduced machining time to prepare the shank ends for threading, since it can be seen that in the instant case much less turning is required. It follows that considerably less scrap results.

With particular reference to FIG. 5, therein is shown a fragment of a shank 27 having a reduced radially extending shoulder 32. The shoulder 32 forms one side of a tilted V-shaped annular groove with the other side being formed by the surface 36. In one concrete form of the invention, the groove is 0.018" deep as measured radially from the vertex to the turned surface 42. The side 36 of the tilted V is disposed at an angle of 25° to the axis of the shank. This angle is critical in order to provide optimum gripping of the aluminum flanged washer on flattening thereof. The shank 27 is turned as at 42 and threaded as indicated at 58. Adjacent the threaded end portion is illustrated a fragment of the novel flange washer, with the inner and outer peripheral surfaces 38 and 29 parallel to each other as well as parallel and coaxial with the central axis of the washer 28.

The peripheral surfaces are joined by the parallel arcuate surfaces 40 and 41. In a concrete embodiment the arcuate or dished surfaces 40 and 41 are uniformly spaced between 0.078" and 0.084", with 0.081" being preferred. The inner surface 41 represents a circular section of a hollow sphere having a radius of 1.500". The outer diameter of the surface 39 in the concrete embodiment is 1.000", with the inner diameter being of the order of 0.655" to 0.658". The latter dimension exceeds the major diameter of the threads, which are 0.651" to 0.655", by a few thousandths of an inch to facilitate easy installation thereover. The method of manufacturing the washer 28 is exceedingly important and will be hereinafter discussed in detail.

Referring to FIGS. 6 and 7, the former illustrates the threaded shank interfitted with the washer prior to flattening of the latter. The clearances between the threads and the internal diameter of the washer alluded to above can best be seen in FIG. 7 and are of the order of a few thousandths to 0.007". After the washer has been placed over the shank, it is flattened so that the point 44 formed by the intersection of the surfaces 40 and 38 is rolled into the vertex of the tilted V. The arcuate surface 40 becomes substantially planar at the inner periphery, as depicted in FIGS. 8 and 9, with a slight fall off at the outer edge thereof. The outer periphery 39 of the washer 38 assumes a frusto-conical or beveled form with the outer radial edge 34 increased in diameter approximately 0.313" in the concrete embodiment alluded to previously. As pointed out above, the inner arcuate surface 41 assumes a slightly dished configuration indicated at 33 in FIGS. 8 and 9 after flattening.

The washer is flattened by holding the shank in a suitable holding means (not shown) and using a hollow punch, such as that shown fragmentarily at 50 in FIG. 6. The punch applies force uniformly around the outer periphery 41 of the washer 28. As the punch travels towards the shoulder 32 on the shank 27, the inner periphery of the washer is toggled into the V groove so that the inner edge is forced into the vortex thereof as shown in FIGS. 8 and 9 at 44.

When the washer is in the assembled position, as shown in FIGS. 8 and 9, it is positively locked to the shank, thereupon becoming a flange which cannot be rotated or removed without destruction thereof. The positive locking action is directly attributable to the toggling action that occurs during the stacking or flattening of the washer 28. It is to be appreciated that the point 44 is rolled into the vertex of the tilted V. This toggles the washer 28 into firm gripping engagement with the periphery of the shank as if it was an integral part thereof. Once assembled to the shank 27, the washer 28 assumes a fluid-tight relationship to the shank which is impervious to all fluids. It is to be appreciated that by positioning the washer 28 forwardly of the threads, the objections to the double nut joint are avoided.

When the shank is assembled to the container wall and the coupling nut drawn up finger-tight, the container falls away slightly from the lateral edges of the washer, with only the edges lying in a substantially vertical plane in contact with the container. Further tightening draws the lateral edges or those in a horizontal plane up against the container wall. Due to the dished design of the washer, the lateral edges come into contact with the container wall before the internal edges. In the great bulk of uses, the container will be of such a diameter that, for all practical purposes, the area of contact of the washer and the container wall is substantially planar. Therefore, when the shank is in the finger-tight position, the distance between the lateral edge and the container wall in a horizontal plane is very slight, as is seen in FIG. 8. However, it is to be emphasized that this point is particularly important (1) if any lateral loads are anticipated, (2) in order to space uniformly the dead weight load and any subsequent dynamic load applied to the joint, and (3) in order to achieve a fluid-tight sealing relationship between the wall and gasket 20.

Use of the novel flange washer above described results in substantial savings in stock material costs, machining time on the shank, as well as providing a more rigid and fluid-tight joint with the container wall than prior art attempts.

The novel washer described is formed, in one concrete embodiment, of sheet aluminum of a thickness of 0.078" to 0.084", with 0.081" preferred. The sheet stock is bnanked and formed in a single operation with a spherical punch (see FIG. 10), giving it the arcuate cross section and circular configuration externally. The formed and blanked section is best described as a circular section of a sphere with the outer periphery parallel to a radius line to the center of the section. In the concrete embodiment mentioned above, the radius of the sphere would be 1.5". In the second operation the center hole is punched concentric with the outer periphery. This punching may be performed by a cylindrical flat ended punch as illustrated in FIG. 11. The sequence of these operations is highly important. For example, if the blanking and punching operations occurred before forming, the edge of the washer would not be parallel with the axis thereof, and the proper fluid-tight gripping of the washer on the shank would not occur when flattening occurred. Additionally, the tolerances of the inner and outer diameters would be difficult to hold, under the sequence of operations of the example, thereby ultimately resulting in an improper fit on the shank.

By forming and blanking, and subsequently punching, the dimensions of the washer can be hled within close tolerances quite easily. This sequence is vitally essential in order to have the proper edge orientation, as mentioned previously. The inner edges must be parallel to the washer axis in order to insure the proper grip between the titled V groove and the inner edge of the washer. This results in a rigid, fluid-tight fit between the washer and shank. When the outer edge is similarly parallel, it results in a beveled surface at the outer edge when flattening takes place. This is important also since it eliminates the necessity of deburring and/or beveling which, as one might surmise, would be additive to the cost of manufacture and felt in the overall cost of the product. Moreover, as mentioned above, the beveled surface streamlines the lock of the overall assembly, making it more attractive from the marketing standpoint.

It is contemplated that the herein described joint is capable of many modifications, such as the use of an assymmetrical mirror arrangement of washers on opposite sides of a wall. For ease of description the principles of the invention have been set forth in connection with but a single illustrated embodiment. It is not my intention that the illustrated embodiment, nor the terminology employed in describing the same, be limiting inasmuch as variations in these may be made without departing from the spirit of the invention. Rather, I desire to be restricted only by the scope of the appended claims.

I claim:

1. The method of joining a shank to an apertured thin walled container which comprises the steps of cutting a shank to form a V-shaped annular groove with one side of the V forming a radially extending shoulder, forming a section of a sphere of uniform thickness, blanking said section so that the outer edge thereof is coaxial and parallel with a radius line drawn to the center thereof, and punching the central portion of said section concentrically and parallel with said outer edge to form a washer from said punched section, placing said washer over the shank in abutment with said radially extending shoulder, flattening said washer by applying force simultaneously at a plurality of locations thereon so as to toggle the inner edge thereof inwardly into said V-shaped annular groove for peripheral sealing and gripping engagement therewith, inserting said shank into said apertured thin walled container and applying means for holding said flattened washer against said wall in rigid fluid-tight contact therewith.

2. The method of claim 1 in which the means for holding said flattened washer against said wall is applied by threadedly connecting it to threads provided on said shank.

3. The method of claim 1 in which a gasket washer is inserted on said shank after said washer is flattened and before said shank is inserted into said apertured thin walled container.

References Cited by the Examiner

UNITED STATES PATENTS

| | | | |
|---|---|---|---|
| 1,109,042 | 9/1914 | Claflin | 285—340 |
| 1,491,873 | 4/1924 | McMurtrie | 285—161 |
| 2,025,224 | 12/1935 | Dodge | 29—520 |
| 2,209,181 | 7/1940 | Wendel | 29—520 X |
| 2,505,312 | 4/1950 | Wagner | 285—161 |
| 2,554,456 | 5/1951 | Coleman | 285—161 |
| 2,564,372 | 8/1951 | Phelps et al. | 29—520 |
| 2,651,529 | 9/1953 | Wayman | 285—161 |
| 2,703,259 | 3/1955 | Neufeld | 285—161 X |
| 2,757,945 | 8/1956 | Bingham | 29—520 X |
| 3,192,611 | 7/1965 | Briechele | 29—522 X |

CHARLIE T. MOON, *Primary Examiner.*